United States Patent
Khosrowpour

(10) Patent No.: US 6,256,689 B1
(45) Date of Patent: Jul. 3, 2001

(54) BUS SYSTEM EXPANDABLE BY CONNECTION OF A BUS BRIDGE CIRCUIT

(75) Inventor: Farzad Khosrowpour, Lyons, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/095,908

(22) Filed: Jun. 11, 1998

(51) Int. Cl.[7] ................................................ G06F 13/00
(52) U.S. Cl. ........................ 710/101; 710/131; 710/107
(58) Field of Search .................................. 710/129, 128, 710/101, 3, 14, 131, 106, 126, 113, 107

(56) References Cited

U.S. PATENT DOCUMENTS

| | | | |
|---|---|---|---|
| 5,764,925 | * | 6/1998 | Noonan ................................ 710/101 |
| 5,774,681 | * | 6/1998 | Kunishige ............................ 710/128 |
| 5,781,747 | * | 7/1998 | Smith et al. ......................... 710/129 |
| 5,790,814 | * | 8/1998 | Gan et al. ............................ 710/128 |
| 5,878,272 | * | 3/1999 | Yanagisawa et al. .................... 710/3 |
| 5,923,860 | * | 7/1999 | Olarig ................................. 710/129 |
| 5,978,878 | * | 11/1999 | Lange .................................. 710/129 |
| 5,983,306 | * | 11/1999 | Corrigan et al. ..................... 710/129 |
| 5,991,839 | * | 11/1999 | Ninomiya .............................. 710/101 |
| 5,991,844 | * | 11/1999 | Khosrowpour ........................ 710/129 |
| 6,006,285 | * | 12/1999 | Jacobs et al. .......................... 710/14 |
| 6,073,195 | * | 6/2000 | Okada .................................. 710/102 |

* cited by examiner

*Primary Examiner*—Meng-Al T. An
*Assistant Examiner*—Jungwon Chang
(74) *Attorney, Agent, or Firm*—Patton Boggs LLP

(57) ABSTRACT

An expandable bus system comprises a first bus and a second bus. A bus bridge detection circuit is operative to detect presence and absence of a common bridge circuit connected between the first bus and the second bus. A bus switching circuit is connected to the first bus and to the second bus, is responsive to the bus bridge circuit detection circuit and is operative to allow signal flow between the first bus and the second bus in response to detection of the absence of a common bus bridge circuit connecting the first bus and the second bus and to impede signal flow between the first bus and the second bus in response to detection of the presence of a common bus bridge circuit connecting the first bus and the second bus. In an embodiment, the first bus and the second bus are provided in a connector configured to releasably connect to a bus bridge circuit, and the bus bridge detection circuit is operative to detect presence and absence of a bus bridge circuit at the connector. The first bus, the second bus, the bus switching circuit and the connector may be included in a first circuit assembly, with the connector being configured to connect to a bus bridge circuit included in a second circuit assembly.

15 Claims, 2 Drawing Sheets

BUS SYSTEM EXPANDABLE BY CONNECTION OF A BUS BRIDGE CIRCUIT

BACKGROUND OF THE INVENTION

1. Field of the Invention

The present invention relates to data communications systems and methods, and more particularly, to bus systems and methods.

2. Statement of the Problem

High-bandwidth busses are typically used to communicate between hosts and peripherals in applications such as computer networks. The bus interfaces used by hosts and peripherals often take different forms depending on the performance characteristics desired. For example, the Peripheral Component Interconnect (PCI) standard defines a high speed synchronous bus well suited for local bus communications between processors and peripherals using low-power CMOS devices over relatively short 32-bit and 64-bit wide data paths. Relatively streamlined in operation, PCI busses can reach transfer rates of up to 264 Mbytes per second on long burst transfers. In contrast, the Small Computer System Interface (SCSI) defined by ANSI X3.131 defines busses which may-operate over much longer lengths without a bus signal, an arrangement more suited for interfacing with peripheral devices such as disk drives. The PCI and SCSI bus standards are described in "*Understanding I/O Subsystems,*" published by Adaptec Press, 1st edition, 1996.

Bus specifications often limit, among other things, the length of the bus and the number of devices that may be attached to the bus in order to maintain performance. For example, PCI and SCSI standards define limits on conductor length and number of devices. In order to increase the capacity of a bus such as a PCI bus, an expanded multi-layer bus structure may be used that includes a plurality of busses connected by high-speed bus bridges. This multi-layer structure can allow an increased number of devices to be interconnected while maintaining bus performance.

Although computer systems and networks may be expanded by the addition of bus bridges, it may be problematic to provide for such expansion. For example, in a personal computer (PC) it is often desirable to provide space for mounting a plurality of local bus peripherals, e.g., PCI agents such as sound cards, video cards, local area network (LAN) cards and the like. Because the PCI standard limits a PCI bus to ten unit loads, a single PCI bus typically can only support three to four expansion slots. PCI-PCI bridges may be used to provide increased capacity, but the numbers of agents provided in particular units may vary widely. Accordingly, it may not be cost effective to provide PCI-PCI bus bridges for bus capacity that may not be utilized by all potential users.

SUMMARY OF THE INVENTION

In light of the foregoing, it is an object of the present invention to provide bus systems and method of operation therefor that can provide bus reconfiguration and expansion in a more flexible and cost-efficient manner.

According to the present invention, these and other objects, features and advantages are provided by bus systems and methods of operation therefore in which bus bridge detection circuit commands a bus switching circuit, e.g., a CMOS bus switch array, to allow signal flow between two busses when the busses are not connected by a bus bridge and to impede signal flow between the busses when the busses are connected by a bus bridge. The bus bridge detection circuit may comprise, for example, a logic circuit operative to detect a grounded pin of a bus bridge circuit assembly connected to a connector in which the two busses are provided.

The present invention provides a bus system in which a single bus composed of two sub-busses linked by a bus switch may be converted into a multiple bus system by simply inserting a bus bridge circuit card into a connector including both subbusses. Accordingly, users that do not require the increased bus capacity afforded by the bus bridge circuit may avoid the cost of the bus bridge circuit while still having use of both sub-busses. Because the reconfiguration of the bus system can be performed automatically upon insertion or removal of a bus bridge circuit card, a user can be relieved of the need to set switches, reprogram devices or the like. In addition, the likelihood of configuration errors can be reduced.

In particular, according to the present invention, an expandable bus system comprises a first bus and a second bus. A bus bridge detection circuit is operative to detect presence and absence of a common bridge circuit connected between the first bus and the second bus. A bus switching circuit is connected to the first bus and to the second bus, is responsive to the bus bridge circuit detection circuit and is operative to allow signal flow between the first bus and the second bus in response to detection of the absence of a common bus bridge circuit connecting the first bus and the second bus and to impede signal flow between the first bus and the second bus in response to detection of the presence of a common bus bridge circuit connecting the first bus and the second bus.

In an embodiment according to the present invention, the first bus and the second bus are provided in a connector configured to releasably connect to a bus bridge circuit, and the bus bridge detection circuit is operative to detect presence and absence of a bus bridge circuit at the connector. The first bus, the second bus, the bus switching circuit and the connector may be included in a first circuit assembly, with the connector being configured to connect to a bus bridge circuit included in a second circuit assembly.

According to method aspects of the present invention, a signal path is provided between a first bus and a second bus responsive to removal of a bus bridge connected between the first bus and the second bus, thereby allowing the first and second busses to operate as a common bus. Responsive to connection of a bus bridge circuit between the first bus and the second bus, signal flow is impeded between the first bus and the second bus, for example, by opening a bus switch connected to the first bus and the second bus. A flexible automatic technique for bus reconfiguration can thereby be provided.

DETAILED DESCRIPTION OF THE EMBODIMENTS

Figure 1:
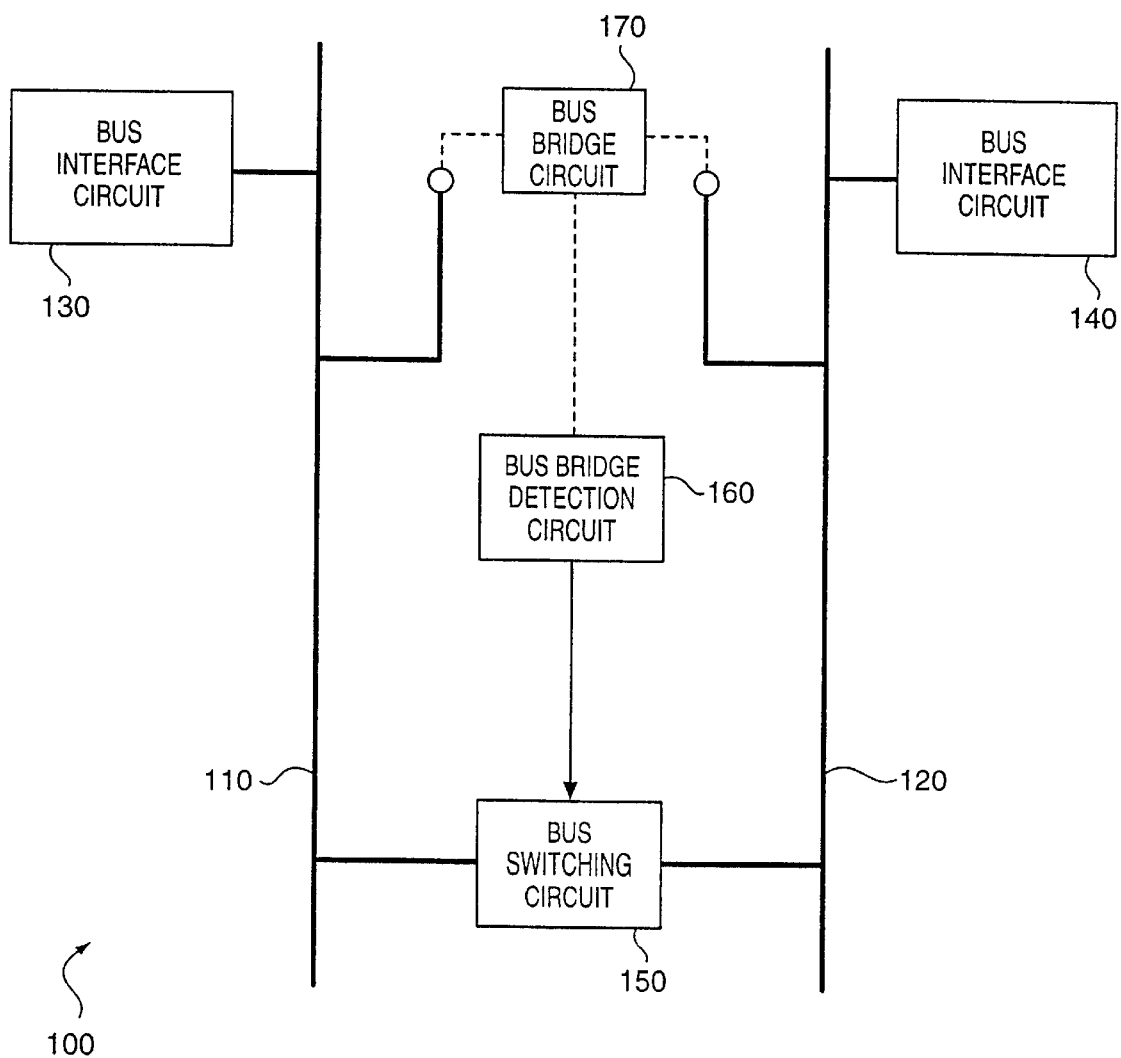
FIG. 1 illustrates an embodiment of an expandable bus system according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

It will be understood that as referred to herein, a "bus" may comprise a conductive, fiber optic or similar pathway for transmission of information from one location to another. For purposes of the discussion herein, busses include but are not limited to parallel and series data paths such as low-voltage differential (LVDS) or single-ended (SE) SCSI, Fibre Channel (FC) and the like. A "bus bridge" according to the present invention may include hardware or combinations of hardware and software that provide connectivity between such busses. Accordingly, a bus bridge may include intermediate busses or other data paths that are used to provide connectivity between busses; for example, embodiments are described herein that include bus bridges comprising intermediate busses, e.g., PCI busses, which are used to provide connectivity between two other types of busses, such as between a Fibre Channel "bus" and an SCSI bus.

FIG. 1 illustrates an embodiment of an expandable bus system 100 according to the present invention. The first and second busses 110, 120 are configured to connect to a common bus bridge circuit 170. Respective first and second bus interface circuits 130, 140 are operative to communicate on respective ones of the first and second busses 110, 120 according to a common bus protocol such as a PCI protocol, a SCSI protocol or the like.

A bus bridge detection circuit 160 is operative to detect the presence or absence of a bus bridge circuit connecting the first and second busses. A bus switching circuit 150 is connected to the first bus 110 and the second bus 120, and responsive to the bus bridge detection circuit 160. When the absence of a bus bridge circuit connecting the first and second busses 110, 120 is detected, the bus switching circuit allows signals to flow between the first and second busses 110, 120, thus allowing the busses 110, 120 to act as a common bus. When the presence of a common bus bridge circuit is detected, however, the bus switching circuit 150 impedes signal flow between the first and second busses 110, 120, thus confining communications between the first and second busses 110, 120 to those occurring over the bus bridge circuit 170.

Those skilled in the art will appreciate that the first and second busses 110, 120 may comprise a variety of bus types, such as PCI busses, SCSI busses and the like. Similarly, the bus bridge circuit 170 may comprise a variety of types of bridge circuits, such as PCI-PCI bridge circuits. Operations of such bridge circuits are well known to those skilled in the art, and are described in general in the aforementioned "Understanding I/O Subsystems." Those skilled in the art will appreciate that, in general, the bus system 100 of FIG. 1 may be implemented using special purpose hardware, software or firmware running on general or special purpose computing devices, or combinations thereof.

Figure 2:
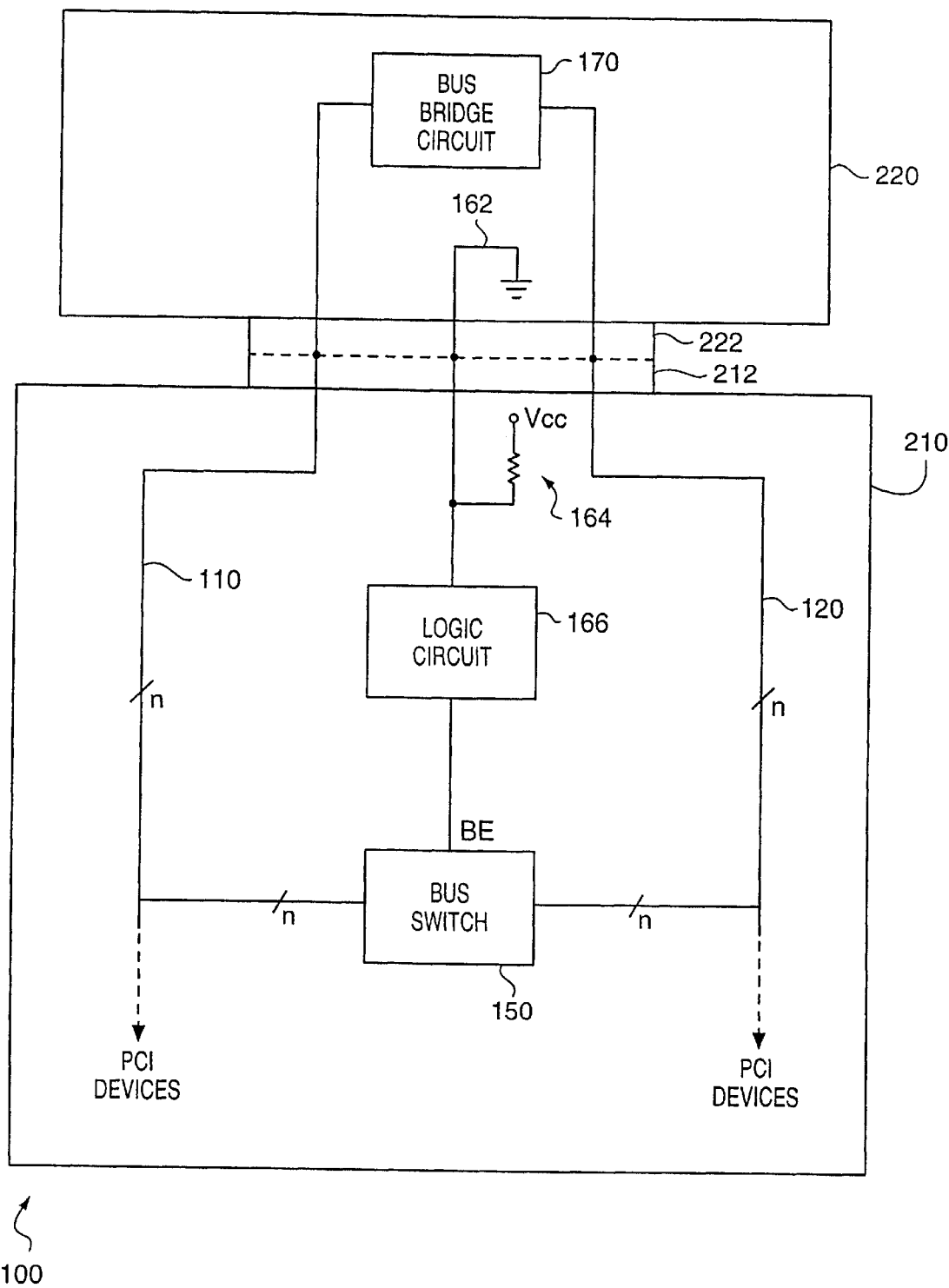
FIG. 2 illustrates another embodiment of an expandable bus system according to the present invention.

In an exemplary embodiment of a bus system 100 illustrated in FIG. 2, a first circuit assembly 210 includes first and second busses 110, 120, each including a plurality n of conductors. The first and second busses 110, 120 are provided to a connector 212. A bus switching circuit 150, e.g., a bus switch such as the CMOS-type QuickSwitch® bus switches sold by Quality Semiconductor, Inc., is connected to the first and second busses 110, 120. A connector 212 is provided to allow connection of a bus bridge circuit 170 included in a second circuit assembly 220 to the first and second busses 110, 120 of the first circuit assembly 210 by means of a mating connector 222.

A bus bridge detection circuit 160 includes a logic circuit 166 which has an input tied to a pin of the connector 212 and connected to a logic voltage $V_{cc}$ by a pull-up circuit 164. When the second circuit assembly 220 is disconnected from the first circuit assembly 210, the pull-up circuit 164 provides a logic "HIGH" input to the logic circuit 166. The logic circuit 166 responsively produces a command signal to a bus switching circuit 150, e.g., to a bus enable BE input of a bus switch, thus causing to the bus switch 150 to allow signals to flow between the first and second busses 110, 120. When the second circuit assembly 220 is connected to the first circuit assembly 210, however, a grounded pin 162 on the second circuit assembly 220 is connected to the input of the logic circuit 166, thus providing a logic "LOW" input to the logic circuit 166. The logic circuit 166 responsively produces a second command signal which commands the bus switch 150 to impede signal flow between the first and second busses 110, 120, thus constraining communications between the first and second busses 110, 120 to the bus bridge circuit 170.

Those skilled in the art will appreciate that a wide number of embodiments other than those illustrated in FIGS. 1 and 2 may be used within the scope of the present invention. The logic circuit 166 may implement signal qualification functions to ensure that bus communications are not inadvertently interrupted by noise or glitches on the signal received from the connector 212. A detection circuit more complex than the illustrated simple pull-up circuit may be utilized, such as a circuit which receives a coded command or a command provided by way of a message communicated over a serial or other communications bus. In addition, the logic circuit 166 may implement procedures to ensure graceful transition between bus configurations. For example, the logic circuit may implement procedures to ensure that pending bus transactions are completed before a configuration change occurs.

In the drawings and specification, there have been disclosed embodiments of the invention. Although specific terms are employed, they are used in a generic and descriptive sense only and not for purposes of limitation, the scope of the invention being set forth in the following claims. It is expected that persons skilled in the art can and will make, use or sell alternative embodiments that are within the scope of the following claims either literally or under the Doctrine of Equivalents.

That which is claimed is:

1. An expandable bus system, comprising:
   a first bus;
   a second bus;
   a bus bridge detection circuit operative to detect presence and absence of a bus bridge circuit connecting said first bus and said second bus; and
   a bus switching circuit connected to said first bus and to said second bus, responsive to said bus bridge detection circuit and operative to allow signal flow between said first bus and said second bus in response to detection of the absence of the bus bridge circuit connecting said first bus and said second bus to operate said first bus and said second bus as a common bus and to impede said signal flow between said first bus and said second bus in response to detection of the presence of the bus bridge circuit connecting said first bus and said second bus.

2. A system according to claim 1, wherein said first bus and said second bus are coupled to a connector and the connector is configured to releasably connect to the bus bridge circuit, and wherein said bus bridge detection circuit is operative to detect the presence and the absence of the bus bridge circuit at said connector.

3. A system according to claim 2, wherein said first bus, said second bus, said bus switching circuit and said connector are included in a first circuit assembly, and wherein said connector is configured to connect to the bus bridge circuit included in a second circuit assembly.

4. A system according to claim 2:
wherein said bus bridge detection circuit is operative to produce a command signal indicating the presence and the absence of the bus bridge circuit at said connector; and
wherein said bus switching circuit is responsive to said command signal.

5. A system according to claim 1, further comprising:
a first bus interface circuit connected to said first bus and operative to communicate signals on said first bus according to a bus protocol; and
a second bus interface circuit connected to said second bus and operative to communicate signals on said second bus according to said bus protocol.

6. A system according to claim 5:
wherein said bus switching circuit is operative to allow signal flow between said first bus interface circuit and said second bus interface circuit in response to detection of the absence of the bus bridge circuit connecting said first bus and said second bus and to impede signal flow between said first bus interface circuit and said second bus interface circuit in response to detection of the presence of the bus bridge circuit connecting said first bus and said second bus.

7. A system according to claim 5, where said first bus interface circuit and said second bus interface circuit are operative to communicate according to a PCI bus protocol.

8. A system according to claim 1:
wherein said first bus comprises a first plurality of conductors;
wherein said second bus comprises a second plurality of conductors; and
wherein said bus switching circuit comprises a bus switch connected to said first plurality of conductors and to said second plurality of conductors.

9. A system according to claim 1:
wherein said first bus comprises a first PCI bus; and
wherein said second bus comprises a second PCI bus.

10. An expandable bus system, comprising:
a first bus;
a second bus; and
bus switching means, operatively associated with said first bus and said second bus, and operative to allow signal flow between said first bus and said second bus responsive to detection of an absence of a bus bridge circuit connecting said first bus and said second bus to operate said first bus and said second bus as a common bus and to impede said signal flow between said first bus and said second bus in response to detection of a presence of the bus bridge circuit connecting said first bus and said second bus.

11. A system according to claim 10, wherein said bus switching means comprises:
a bus bridge detection circuit operative to detect the presence and the absence of the bus bridge circuit connecting said first bus and said second bus; and
a bus switching circuit connected to said first bus and to said second bus, responsive to said bus bridge detection circuit and operative to allow signal flow between said first bus and said second bus in response to detection of the absence of the bus bridge circuit connecting said first bus and said second bus and to impede said signal flow between said first bus and said second bus in response to detection of the presence of the bus bridge circuit connecting said first bus and said second bus.

12. A method of operating a bus bridge system including a first bus and a second bus, the method comprising the steps of:
allowing signal flow between said first bus and said second bus responsive to detection of an absence of a bus bridge circuit connecting said first bus and said second bus to operate said first bus and said second bus as a common bus; and
impeding said signal flow between said first bus and said second bus in response to detection of a presence of the bus bridge circuit connecting said first bus and said second bus.

13. A method according to claim 12, wherein said step of allowing said signal flow comprises the step of closing a bus switch connected to said first bus and said second bus to thereby allow said signal flow between said first bus and said second bus.

14. A method according to claim 12, wherein said step of impeding said signal flow comprises the step of opening a bus switch connected to said first bus and said second bus.

15. A method according to claim 12, wherein said first bus and said second bus are provided in a connector configured to releasably connect to the bus bridge circuit, and further comprising the step of connecting the bus bridge circuit to the connector.

* * * * *